TRAGESER & SCHREIBER.
Coil for Brewer's Boilers.
No. 55,747.
Patented June 19, 1866.
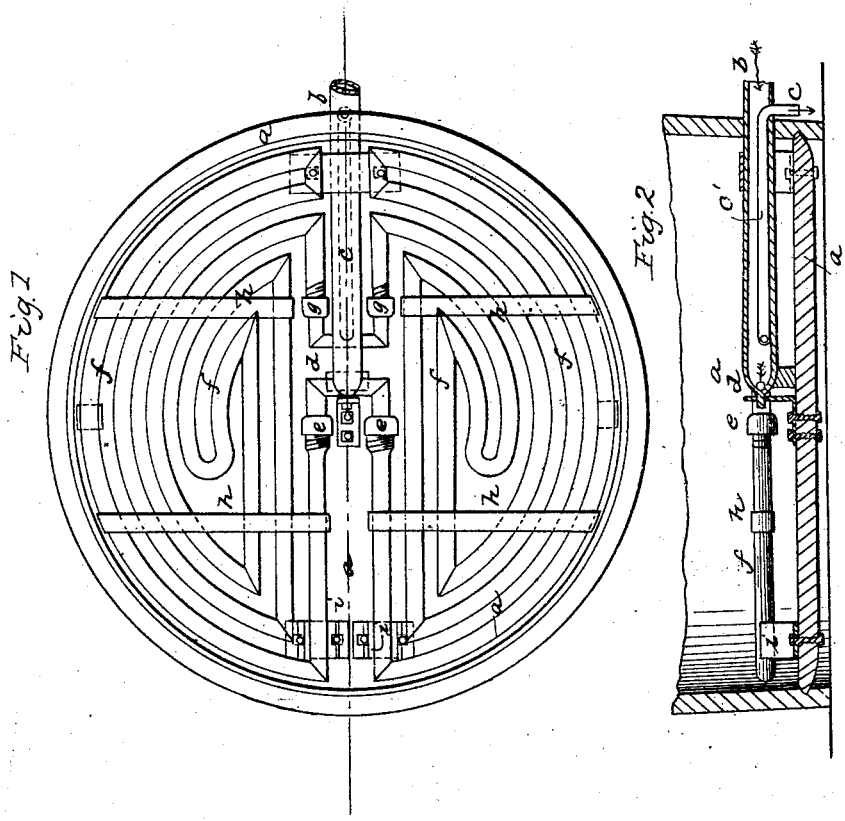
Witnesses
Chas H Smith
Geo D Walker
Inventor
J Trageser
John G Schreiber
per L W Sewell

UNITED STATES PATENT OFFICE.

J. TRAGESER AND J. G. SCHREIBER, OF NEW YORK, N. Y.

IMPROVEMENT IN COILS FOR BREWERS' BOILERS.

Specification forming part of Letters Patent No. 55,747, dated June 19, 1866.

*To all whom it may concern:*

Be it known that we, JOHN TRAGESER and JOHN G. SCHREIBER, of the city and State of New York, have invented, made, and applied to use a certain new and useful Improvement in Coils for Steam Boiling Apparatus; and we do hereby declare the following to be a full, clear, and exact description of the said invention, reference being had to the annexed drawings, making part of this specification, wherein—

Figure 1 is a plan of said steam-coil as in place for use, and Fig. 2 is a longitudinal section of the steam and condensation pipes.

Similar letters denote the same parts.

Several different kinds of steam-coils have heretofore been made in which the pipes can be turned up for facilitating the cleaning of the boiling-tun or other vessel containing such coil. An apparatus of this kind is shown in Letters Patent granted to J. Trageser, February 21, 1865.

The nature of our said invention consists in a double tube provided with couplings at the ends of cross-pipes connecting the half-circle steam-coils, and forming the hinges upon which they turn, said double tube allowing for the introduction of steam and the escape of condensation, so that there is but one opening through the vessel containing the coil, and liability of leakage is lessened, because the whole of the tubes are free to expand or contract by the changes of temperature to which they are subjected, and the heat is much more uniformly applied to all parts of the material to be heated.

In the drawings, $a$ represents a portion of the vessel containing the coil. $b$ is the steam-pipe, within which is the condensation-pipe $c$. $d$ is a cross-pipe or T with couplings $e\ e$ for the steam-pipes of the half-circle coils $f\ f$, which pipes are led back and forth in the form of arcs and chords of circles, in the manner shown, and terminating at the couplings $g\ g$ to the cross-pipe or T that communicates with the pipe $c$ and conveys away the condensation.

The pipes $f\ f$ are connected to each other by the straps $h\ h$ to make them stronger, and the crotches or bearings $i\ i$ sustain the weight of the pipes $f$, but allow them to turn upon themselves and the couplings $e$ and $g$, which are in line with each other, so that the half-circle coils can be raised up as required for cleaning the boiling-tun or other vessel in which the steam-coil is placed.

The condensation passes away by the pipe $c$, which, being slightly below the level of the pipes in the coil, allows the water of condensation to flow off freely, and there is no place in the said pipes where the water can remain and trap the pipe, preventing circulation of the steam when the coil is in use.

What we claim, and desire to secure by Letters Patent, is—

The steam-pipe $b$ and condensation-pipe $c$, provided with the couplings $e\ e$ and $g\ g$, in combination with the coils $f\ f$, substantially as and for the purposes set forth.

In testimony whereof we hereunto set our signatures this 25th day of April, A. D 1866.

JOHN TRAGESER.
JOHN G. SCHREIBER.

Witnesses:
CHAS. H. SMITH,
GEO. D. WALKER.